United States Patent
He et al.

(10) Patent No.: US 9,626,048 B2
(45) Date of Patent: Apr. 18, 2017

(54) TOUCH SCREEN AND RELATED TOUCH SENSING CONTROL CIRCUIT

(71) Applicant: HIMAX TECHNOLOGIES LIMITED, Tainan (TW)

(72) Inventors: Jia-Ming He, Tainan (TW); Yaw-Guang Chang, Tainan (TW); Chia-Wei Hu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 67 days.

(21) Appl. No.: 14/247,243

(22) Filed: Apr. 7, 2014

(65) Prior Publication Data

US 2015/0199044 A1 Jul. 16, 2015

Related U.S. Application Data

(60) Provisional application No. 61/926,410, filed on Jan. 13, 2014.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258; G06F 3/044
See application file for complete search history.

(56) References Cited

U.S. PATENT DOCUMENTS

| 8,711,120 B2 * | 4/2014 | Hargreaves ............. G06F 3/044 178/18.08 |
| 2009/0085230 A1 * | 4/2009 | Fuse ................... G06F 17/5072 257/786 |
| 2010/0002021 A1 * | 1/2010 | Hashimoto .......... G09G 3/2003 345/690 |
| 2010/0194697 A1 * | 8/2010 | Hotelling et al. ............ 345/173 |
| 2011/0096462 A1 * | 4/2011 | Shimanouchi ......... H01G 5/015 361/287 |
| 2011/0134076 A1 * | 6/2011 | Kida et al. .................... 345/174 |
| 2011/0291963 A1 * | 12/2011 | Woo ...................... G06F 3/0412 345/173 |
| 2012/0169629 A1 * | 7/2012 | Shih et al. .................... 345/173 |

(Continued)

FOREIGN PATENT DOCUMENTS

| CN | 103365461 A | 10/2013 |
| TW | 201115443 | 5/2011 |

(Continued)

*Primary Examiner* — Kent Chang
*Assistant Examiner* — William Lu
(74) *Attorney, Agent, or Firm* — Winston Hsu; Scott Margo

(57) ABSTRACT

Disclosed herein are touch screens that integrate touch sensing systems with display devices. The touch sensing system serves data lines and common electrodes of a driving circuitry of the display device as touch driving lines and touch sensing lines for touch sensing operations. A common electrode layer having the common electrodes of the driving circuitry includes a plurality of openings for reducing a base mutual-capacitance of the touch sensing system.

12 Claims, 8 Drawing Sheets

(56) References Cited

U.S. PATENT DOCUMENTS

| | | | |
|---|---|---|---|
| 2012/0242597 A1* | 9/2012 | Hwang et al. | 345/173 |
| 2012/0249444 A1* | 10/2012 | Lee et al. | 345/173 |
| 2013/0033439 A1* | 2/2013 | Kim et al. | 345/173 |
| 2013/0141343 A1* | 6/2013 | Yu et al. | 345/173 |
| 2013/0257774 A1* | 10/2013 | Kim et al. | 345/173 |
| 2013/0321296 A1* | 12/2013 | Lee et al. | 345/173 |
| 2013/0328812 A1* | 12/2013 | Kim et al. | 345/173 |
| 2014/0111466 A1* | 4/2014 | Kim et al. | 345/174 |

FOREIGN PATENT DOCUMENTS

| | | |
|---|---|---|
| TW | 201120720 | 6/2011 |
| TW | 201250545 | 12/2012 |

* cited by examiner

TOUCH SCREEN AND RELATED TOUCH SENSING CONTROL CIRCUIT

CROSS REFERENCE TO RELATED APPLICATIONS

This application claims the benefit of U.S. provisional application No. 61/926,410, filed on Jan. 13, 2014 and incorporated herein by reference.

BACKGROUND OF THE INVENTION

1. Field of the Invention

The present invention relates to touch screens, and more particularly, and to a touch screen having low base mutual-capacitance and a related touch sensing control circuit for performing touch sensing operations.

2. Description of the Prior Art

A capacitive touch screen consists of an insulator such as glass, coated with a transparent conductor such as indium tin oxide. As the human body is also an electrical conductor, touching the surface of a touch screen results in a distortion of the electric field of the touch screen, measurable as a change in capacitance. Different technologies may be used to determine the location of the touch.

Projected capacitive touch technology is one of most popular technologies, which allows more accurate and flexible operation in touch sensing. An X-Y grid is formed either by etching one layer to form a grid pattern of electrodes, or by etching two separate, perpendicular layers of conductive material with parallel lines to form the grid.

Typically, there are two types of projected capacitive touch sensing technologies: self-capacitance and mutual-capacitance. In a mutual-capacitance touch sensing system, driving lines and sensing lines are used to measure mutual-capacitance. The driving lines are usually disposed in a direction perpendicular to another direction in which the sensing lines are disposed, thereby forming a grid pattern having a plurality of intersections, where the driving lines and the sensing lines are separated by a non-conducting layer. During touch sensing operation, a driving signal is applied to the driving lines on a line-by-line basis. Accordingly, charges impressed on the driving line due to the driving signal capacitively couple to the sensing lines that are intersected. This leads to a measurable current and/or voltage on the sensing lines. The relationship between the driving signal and signal measured on sensing lines is related to the capacitance coupling the driving and sensing lines. It is therefore possible to measure the capacitances (i.e., mutual-capacitance) of coupling capacitors at the intersections according to the driving signal and the measured sensing signals.

When bringing a touch object (e.g. a finger or conductive stylus) near a surface of the touch sensing system, it changes a local electric field around certain intersections, which reduces the capacitances measured at these intersections. A touch location can be therefore accurately determined according to capacitance changes. Generally, a capacitance change is found by monitoring a variation of a base capacitance at each intersection, where the base capacitance is the capacitance measured at an intersection when there is no touch object close to the intersection. In the touch sensing system, an analog-to-digital converter (ADC) is typically used for quantizing the capacitance, and the ADC usually needs certain resolution to quantize the variation of the base capacitance to a certain degree of precision.

At present, the touch sensing systems that are used widely includes an on-cell touch sensing system which is attached outside of a display device and an in-cell touch sensing system which is embedded in the display device. The in-cell touch sensing system more compactly integrates the touch sensing system with the display device, and therefore the driving lines are very close to the sensing lines. This allows the base capacitance to become larger than the base capacitance of the on-cell touch sensing system. When the capacitance change is relatively tiny compared to the base capacitance, the touch sensing system requires a high resolution ADC to quantize the variation of the base capacitance. For example, assuming that the base capacitance at an intersection is 21.4 pF, the capacitance change due to a touch is 0.1 pF and the capacitance change needs to be quantized to 256 levels, it is necessary to use an ADC having at least 16-bit resolution to convert the capacitance change of 0.1 pF into 256 levels ($256/2^{16}=0.1/21.4$). As the manufacturing cost of the ADC depends on the resolution of the ADC, this undesirably increases the manufacturing cost of touch sensing system.

SUMMARY OF THE INVENTION

With this in mind, it is one objective of the present invention to provide a touch screen having low base mutual-capacitance, thereby reducing the requirement for the high resolution ADC. In addition, it is one objective of the present invention to provide a touch sensing control circuit that can adjust the base mutual-capacitance by applying touch driving signals having different polarities and/or different magnitudes.

According to one embodiment of the present invention, a touch screen is provided. The touch screen comprises: a display device and a touch sensing control circuit. The display device has a pixel array, a plurality of data lines and a common electrode layer. The plurality of data lines are arranged for driving the pixel array. The common electrode layer has a plurality of openings, and is arranged for providing a common voltage to the pixel array. The touch sensing control circuit is coupled to the common electrode layer and a plurality of first data lines of the plurality of data lines, and is arranged for generating a first touch driving signal, applying the first touch driving signal to the plurality of first data lines, and detecting a plurality of touch sensing signals respectively from a plurality of common electrodes of the common electrode layer when the first touch driving signal is applied to one of the first data lines.

According to one embodiment of the present invention, a touch sensing control circuit is provided. The touch control circuit comprises: a signal generation circuit and a detection circuit. The signal generation circuit is coupled to a plurality of data lines of a display device, and arranged for generating a first touch driving signal, and applying the first touch driving to a plurality of first data lines of the data lines. The detection circuit is coupled a plurality of common electrodes of the display device, and arranged for detecting a plurality of touch sensing signals from the common electrodes when the first touch driving signal is applied to one of the first data lines.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
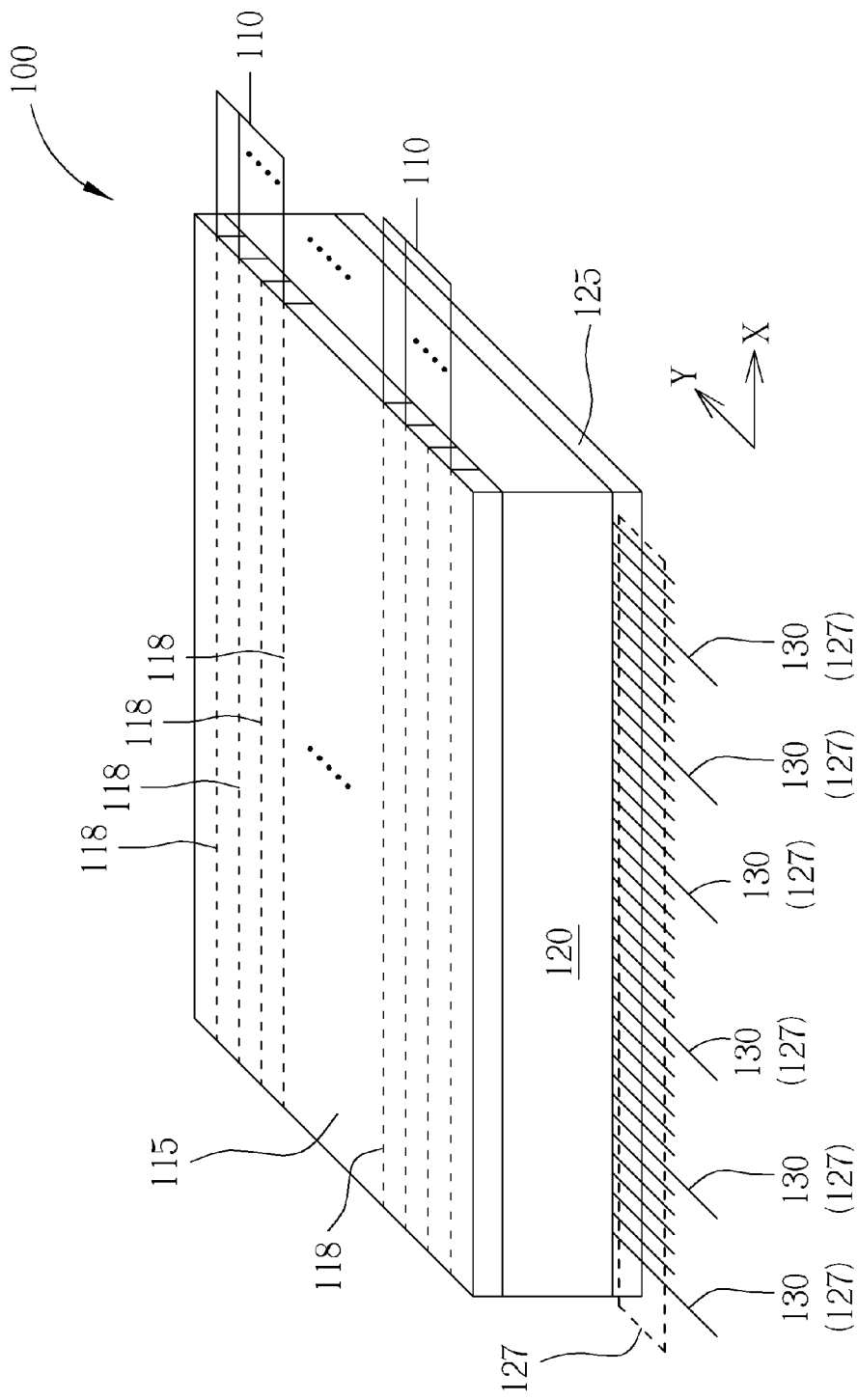
FIG. 1 illustrates a simplified schematic diagram of a touch screen according one embodiment of the present invention.

In the present invention, a touch screen consists of a touch sensing system and a display device. The touch sensing system shares a part of driving circuitry of the display device. Please refer to FIG. 1, which schematically illustrates a simplified diagram of a touch screen according to one embodiment of the present invention. Please note that there is only a part of structure of the touch screen is illustrated for the sake of the brevity. However, this is not intended for limiting the scope of the present invention. As shown by the diagram, in the touch screen 100 of the present invention there is a common electrode layer 115 (e.g. Vcom layer) disposed above a liquid crystal layer 120. A plurality of common electrodes 118 encompass the common electrode layer 115. The common electrodes 118 are disposed along with a first direction, for example, X-axis direction. A certain number of common electrodes 118 are grouped and connected together to form a touch sensing line 110. A touch sensing control circuit (not shown) is connected to touch sensing lines 110, and measures the voltage/current on each of the touch sensing lines 110 during a touch sensing period. Below the liquid crystal layer 120, there are a plurality of touch driving lines 130, which may be disposed on a substrate 125 of the touch screen 100. In addition, the touch driving lines 130 are disposed along a second direction that is perpendicular to the first direction, for example, Y-axis direction. The touch driving lines 130 are actually a part of data lines 127 of the touch screen 100.

Typically, a display device including the liquid crystal layer 120 of touch screen 100 is driven by source drivers and gate drivers (not shown). The source drivers are connected to the data lines 127 that are disposed on the substrate 125. The source driver generates a pixel data signal that carries gray scale information in voltage form and applies the pixel data signal to one of the data lines 127. Accordingly, a voltage difference between a level on the applied data line 127 and a level of a corresponding common electrode 118 that a common voltage is applied manipulates the orientation of a corresponding liquid crystal cell in the liquid crystal layer 120, thereby controlling the brightness of a certain pixel. During a frame period, each data line 127 is used to supply the pixel data signal only within a relatively short period. Hence, the touch sensing control circuit of the present invention uses remaining part of the frame period to apply the touch driving signal to some of the data lines 127 that serves as the touch driving lines 130. Accordingly, the touch sensing control circuit measures the voltage/current on each of touch sensing lines 110 to detect the touch sensing signal Rx that is related to a mutual-capacitance at a certain intersection. That is, the touch sensing control circuit of the touch screen 100 of the present invention shares the data lines and common electrodes of the driving circuitry of the display device to perform touch sensing operations.

Figure 2:
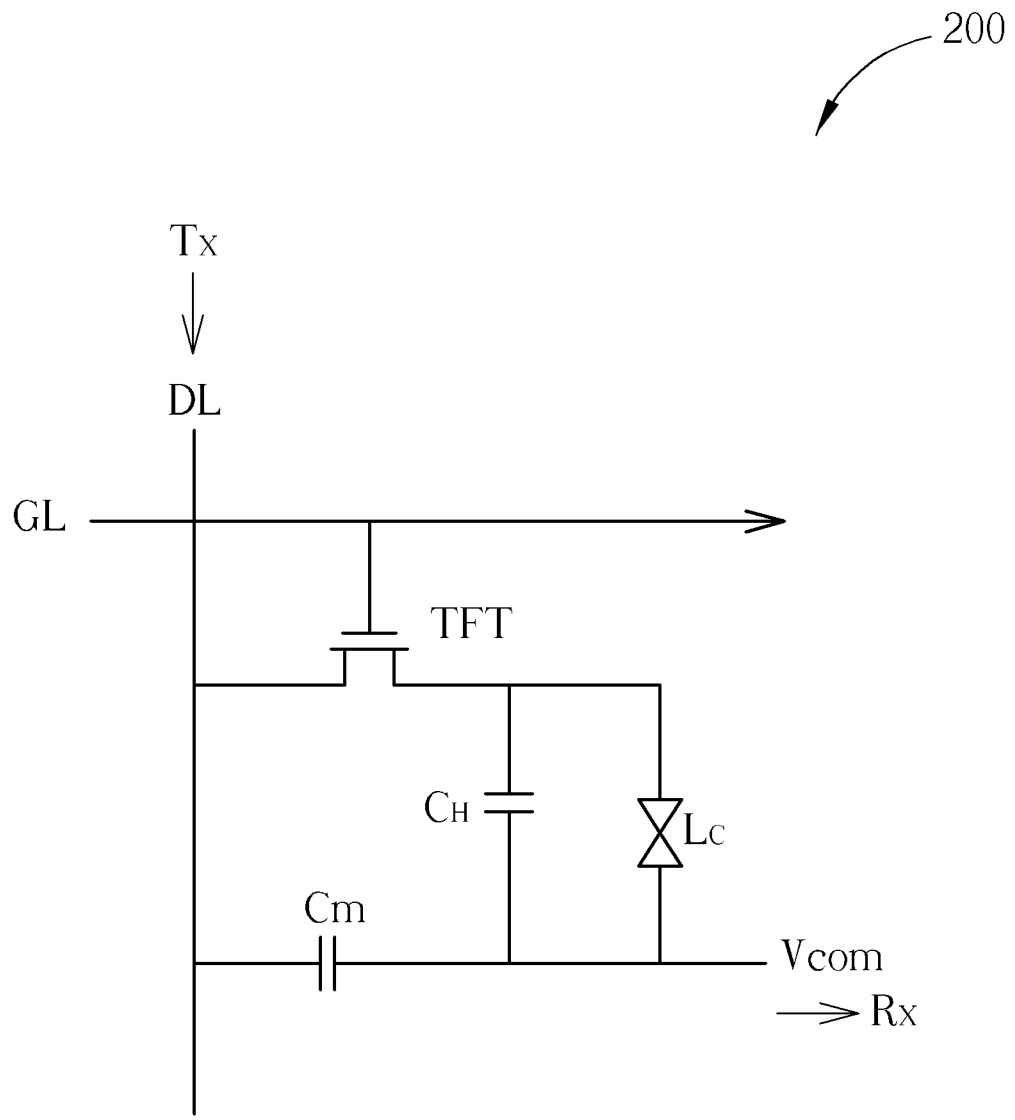
FIG. 2 illustrates a diagram of a coupling capacitor formed at an intersection of a driving line and a sensing line according one embodiment of the present invention.

FIG. 2 illustrates how a mutual capacitance forms between a driving line and a sensing line of the touch screen of the present invention. As shown by the diagram, if the touch driving signal Tx is applied to the data line DL of the pixel 200 when the gate line GL is un-active, charges impressed on the data line DL and coupling the common electrode Vcom forms a coupling capacitor Cm. The capacitance of the coupling capacitor Cm can be measured according to the touch driving signal Tx applied to the data line DL and the touch sensing signal Rx detected on the common electrode Vcom. Since a width of a pixel is usually smaller than a width of the touch object, there is no need to apply the touch driving signal to every data line of the display device. In addition, this is also the reason why several rows of common electrodes are connected together to form a single touch sensing line.

Figure 3A:
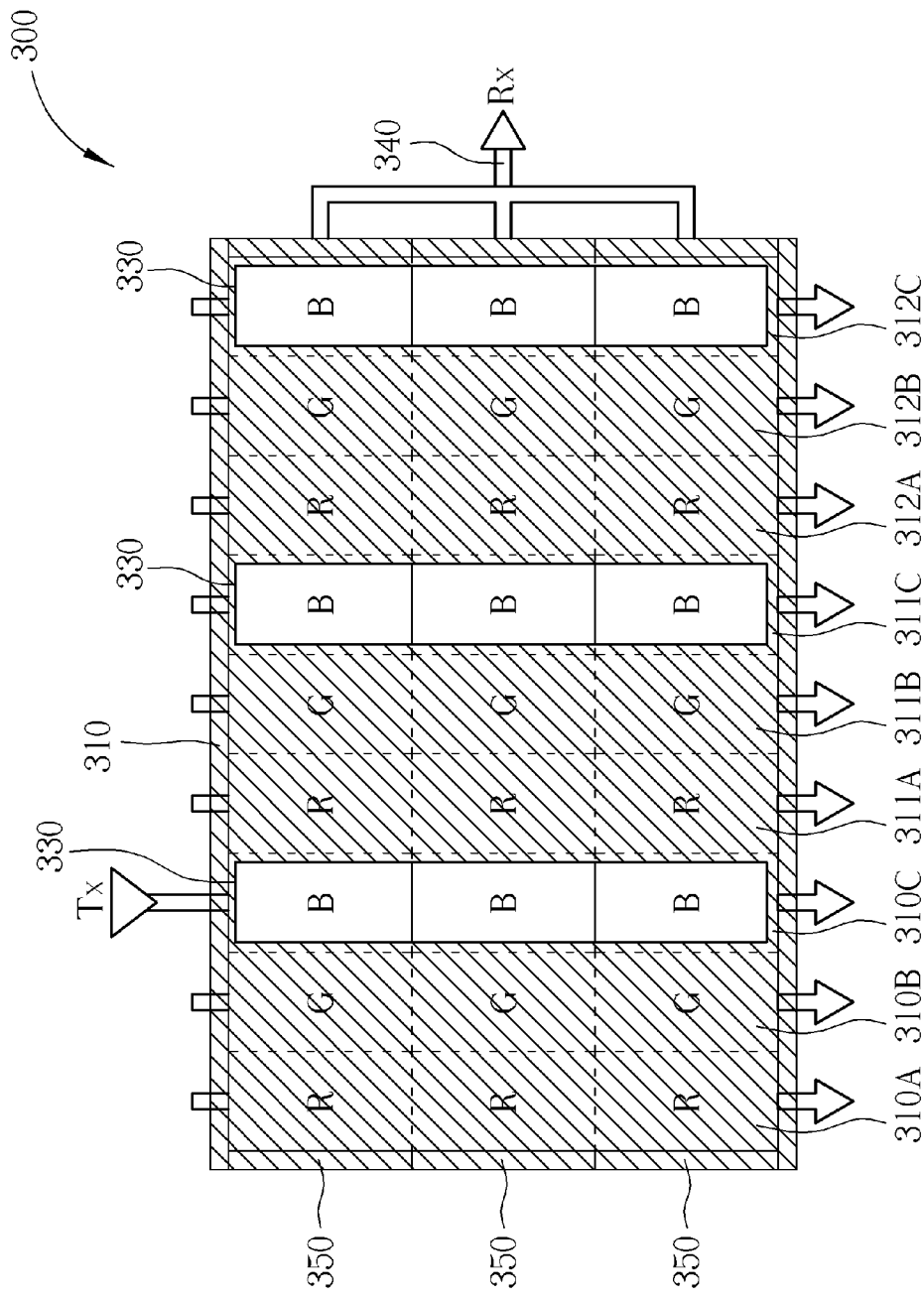
FIGS. 3A-3C illustrate arrangements of touch sensing driving lines and openings of a common electrode layer according embodiments of the present invention.

FIG. 3A illustrates a part of a pixel array of a display device of a touch screen according to one embodiment of the present invention. In this embodiment, the touch driving signal Tx is applied to the data line 310C corresponding to blue sub-pixels (i.e. blue sub-pixels in a first column of blue sub-pixels). Accordingly, a touch sensing signal Rx is detected from a touch sensing line 340 that is formed by connecting a group of the common electrodes 350. Hence, the capacitance at the intersection of the applied data line 310A and the group of the common electrodes 350 can be measured.

Figure 3B:
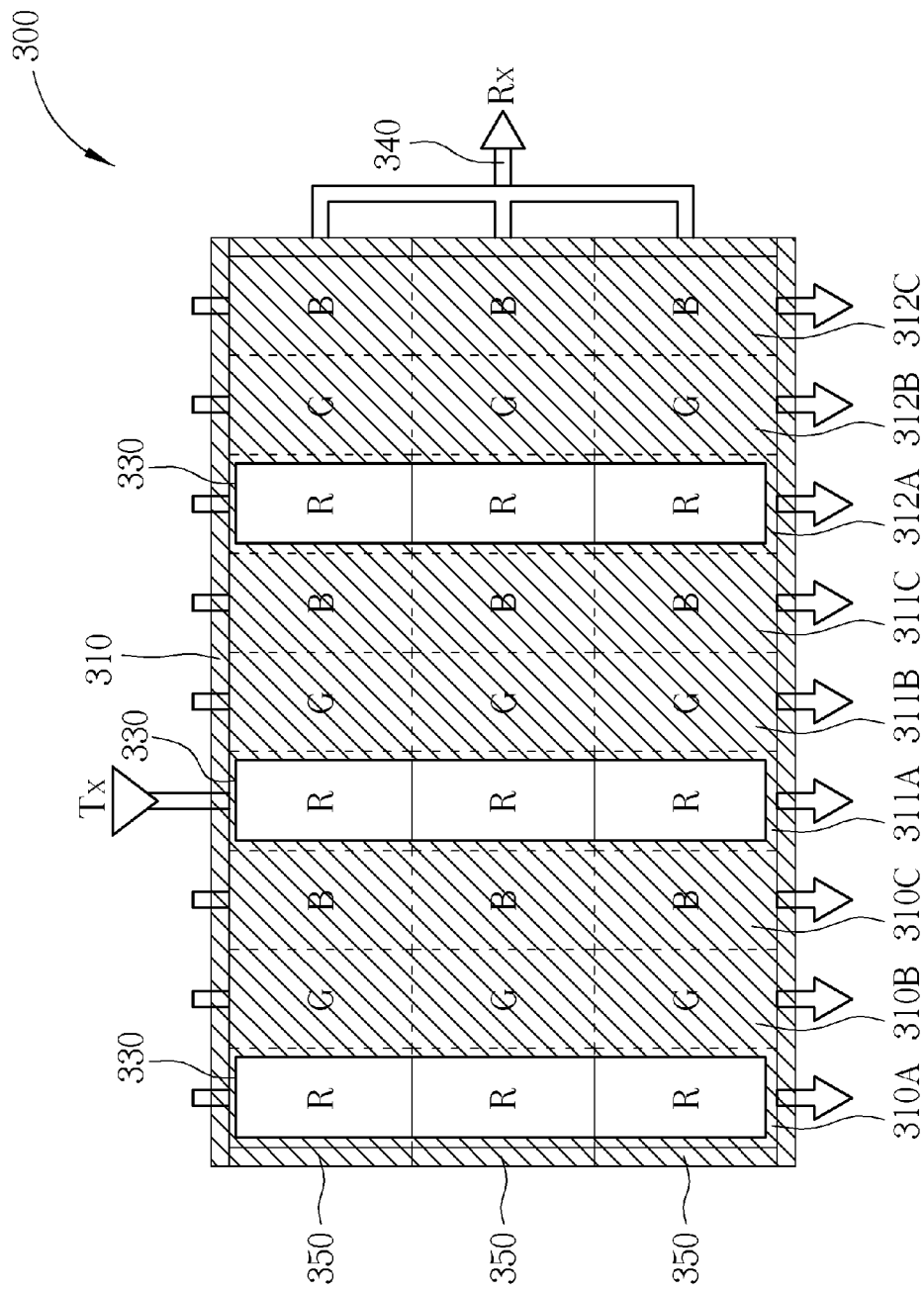
Figure 3C:
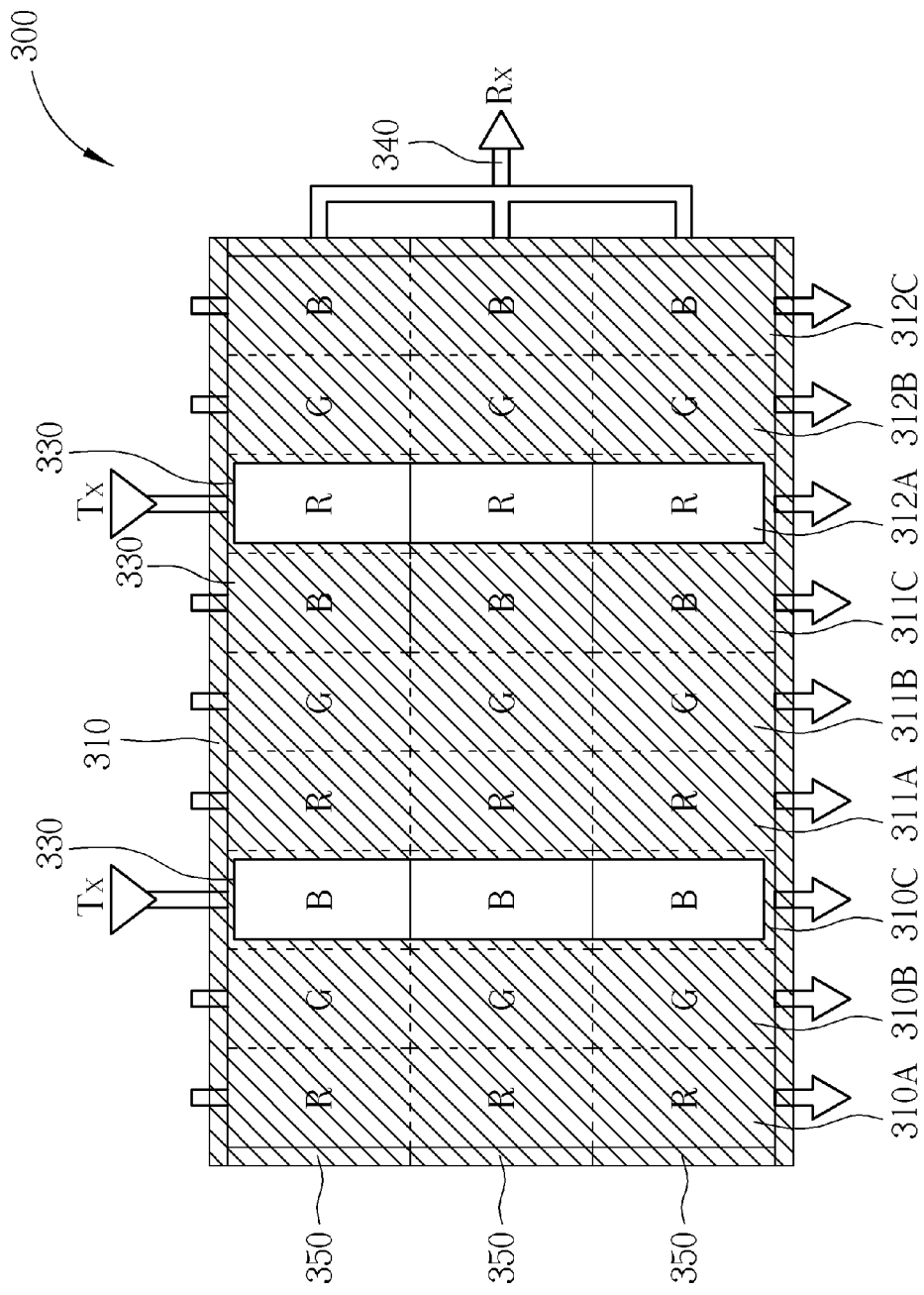

The common electrodes 350 form a common electrode layer 310. The common electrode layer 310 is disposed above the pixel array 300. The common electrode layer 310 has plurality of openings 330. The openings 330 could be aligned with the arrangement of blue sub-pixels. That is, they are disposed above the columns of blue sub-pixels and aligned with the columns of blue sub-pixels. The opening 330 affects the neighboring electric field such that the measured base capacitance at the intersection around the opening 330 is reduced. This helps to alleviate the requirement for the resolution of the ADC. In another embodiment shown by FIG. 3B, the openings 330 of the common electrode layer 310 are above and aligned with the columns of red sub-pixels and the touch driving signal Tx is applied to the data line 311A corresponding to a second column of the red sub-pixels. In still another embodiment shown by FIG. 3C, the openings 330 of the common electrode layer 310 are above and aligned with the columns of sub-pixels of different colors and the touch driving signal Tx is applied to the data lines corresponding to columns of sub-pixels that are below the openings 330.

As can be comprehended from the above embodiments, the arrangement of the touch driving and the openings can be different in various embodiment of the present invention. As long as the touch driving signal is applied to one or more of the data lines corresponding to the columns of sub-pixel that are below and aligned with the openings of the common electrode layer, the base capacitance can be reduced. In addition, although FIGS. 3A-3A merely illustrate arrangements of the touch driving and the openings regarding a part of the pixel array, the arrangement of the touch driving and the openings on a rest part of pixel array can be implemented with same rules, however. In addition, the shape of the opening 330 may be different in various embodiments of the present invention. For example, there may be multiple smaller openings rather a single large one (like FIG. 3A-3C), disposed above and aligned with a column of the sub-pixels whose data line that the touch driving signal is applied to, in one embodiment of the present invention.

Figure 4A:
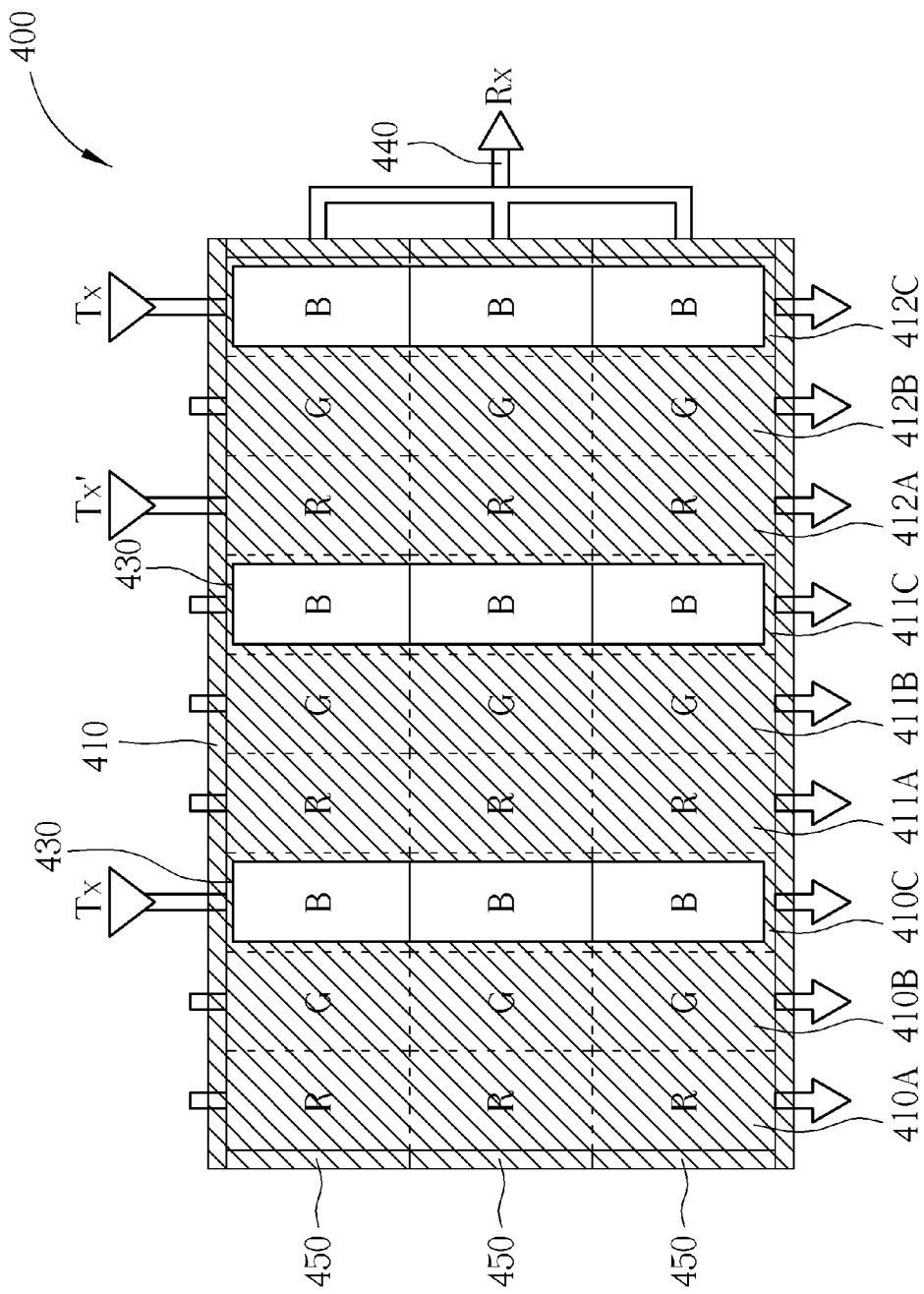
FIGS. 4A-4B illustrate arrangements of touch sensing driving lines and openings of a common electrode layer according embodiments of the present invention.

FIG. 4A illustrates a part of pixel array of a display device of a touch screen according to another embodiment of the present invention. In this embodiment, there are two types of touch driving signals, one of which is Tx while the other of which is Tx'. The touch driving signals Tx and Tx' are opposite in polarity but have same magnitude. In addition, the touch driving signals Tx is applied to the data lines corresponding to two columns of blue sub-pixels. That is, the touch driving signal Tx is simultaneously applied to the data lines 410C of the first column of blue sub-pixels, and to the data lines 412C of the third column of blue sub-pixels. In addition, the driving signals Tx' is applied to the data line 412A corresponding to the third column of red sub-pixels while the touch driving signal Tx is being applied. The openings 430 of the common electrode layer 410 are above and aligned with the columns of blue sub-pixels. Since the openings are only above and aligned with the columns of blue sub-pixels, the touching driving signal Tx' causes a larger base capacitance to be measured at the touch sensing line 440 (consisting of several common electrodes 450 of the common electrode layer 410). This is because when there is no opening disposed above the data line 412A that the touch driving signal Tx' is applied to, more charges will be induced on the corresponding intersection. However, as the touch driving signal Tx' is opposite in polarity to the touch driving signal Tx, the equivalent base capacitance based on the touch driving signal Tx and Tx' at the intersection could be a double of the base capacitance caused by the touch driving signal Tx (because tx is simultaneously applied to two data lines) minus the base capacitance caused by the touch driving signal Tx'. Also the capacitance change will be a double of the capacitance change in response to the touch driving signal Tx minus the capacitance change in response to the touch driving signal Tx'. For example, assuming that the base capacitance caused by the touch driving signal Tx is 21.4 pF and the base capacitance caused by the touch driving signal Tx' is 35.4 pF, the equivalent base capacitance measured at the corresponding intersection will become:

2×21.4−35.4=7.8 (pF);

in addition, assuming that the capacitance change in response to the touch driving signal Tx is 0.1 pF and the capacitance change in response to the touch driving signal Tx' is 0.03 pF, the equivalent capacitance change due to a touch measured at the corresponding intersection will become:

2×0.1−0.03=0.17 (pF).

Hence, the ratio of the capacitance change to the total capacitance will be 0.17/7.8. The ADC of the touch sensing system only requires 14-bit resolution to quantize the capacitance change of 0.17 pF to 256 levels. Therefore, this significantly alleviates the requirement for the high resolution ADC.

Figure 4B:
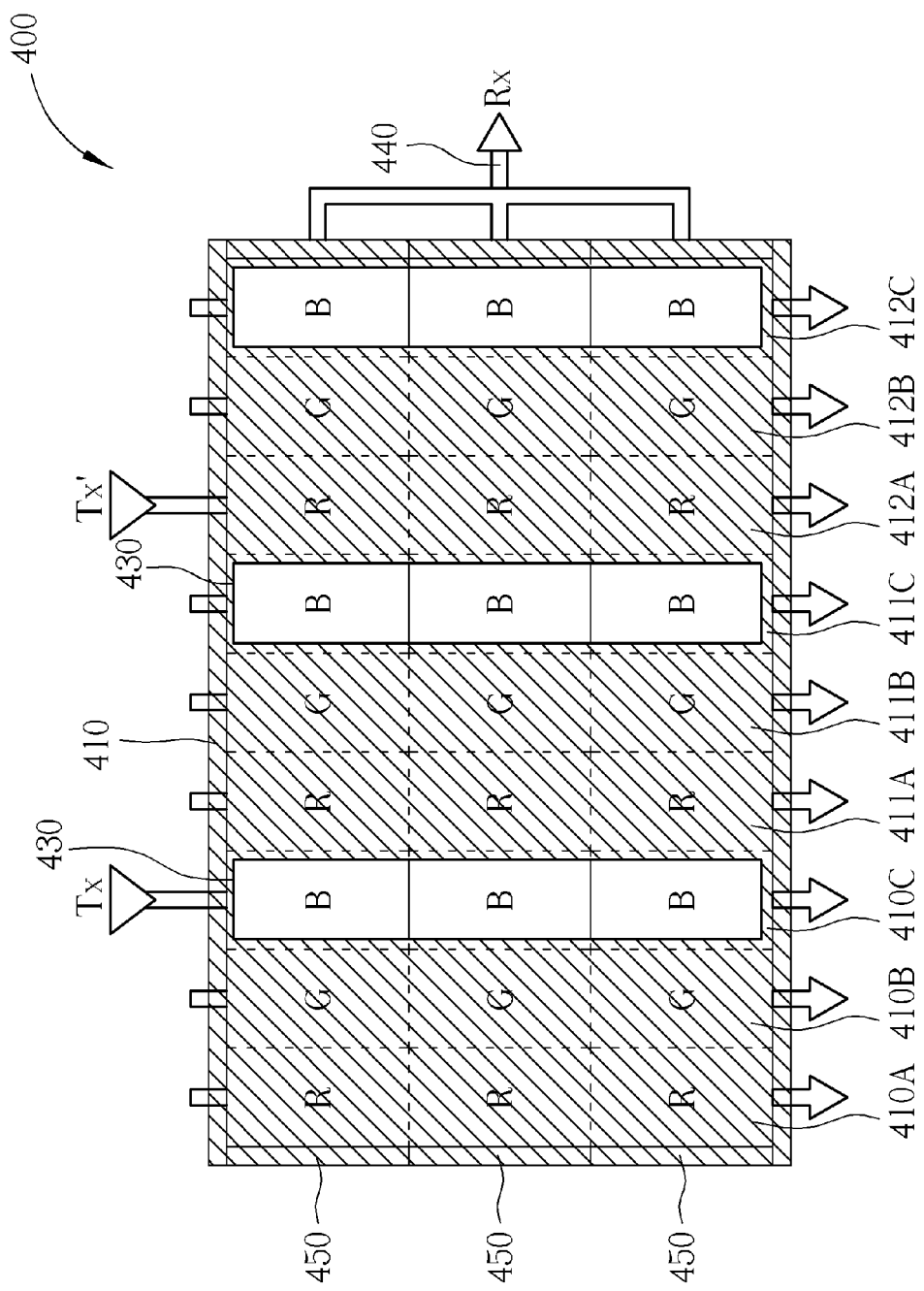

FIG. 4B illustrates a modification based on the embodiments shown by FIG. 4A. In this embodiment, there are also two types of touch driving signals, one of which is Tx while the other of which is Tx'. The touch driving signals Tx and Tx' are opposite in polarity and have different magnitudes. The touch driving signal Tx is applied to the data line 410C corresponding to a first column of blue sub-pixels while the driving signal Tx' is applied to the data line 412A corresponding to the third column of red sub-pixels. As explained above, the base capacitance caused by touch driving signal Tx is smaller than that caused by touch driving signal Tx' due to the opening 440 disposed above. However, if the magnitude of touch driving signal Tx' is just a fraction of the magnitude of touch driving signal Tx, the equivalent base capacitance could be as small as it is in the embodiment shown by FIG. 4A. For example, assuming that the magnitude of touch driving signal Tx' is 0.4 time of the magnitude of touch driving signal Tx, the equivalent base capacitance is: 21.4−35.4×0.4=7.24 (pF). Hence, this embodiment also reduces the base capacitance, thereby alleviating the requirement for high resolution ADC in the touch sensing system.

Figure 5:
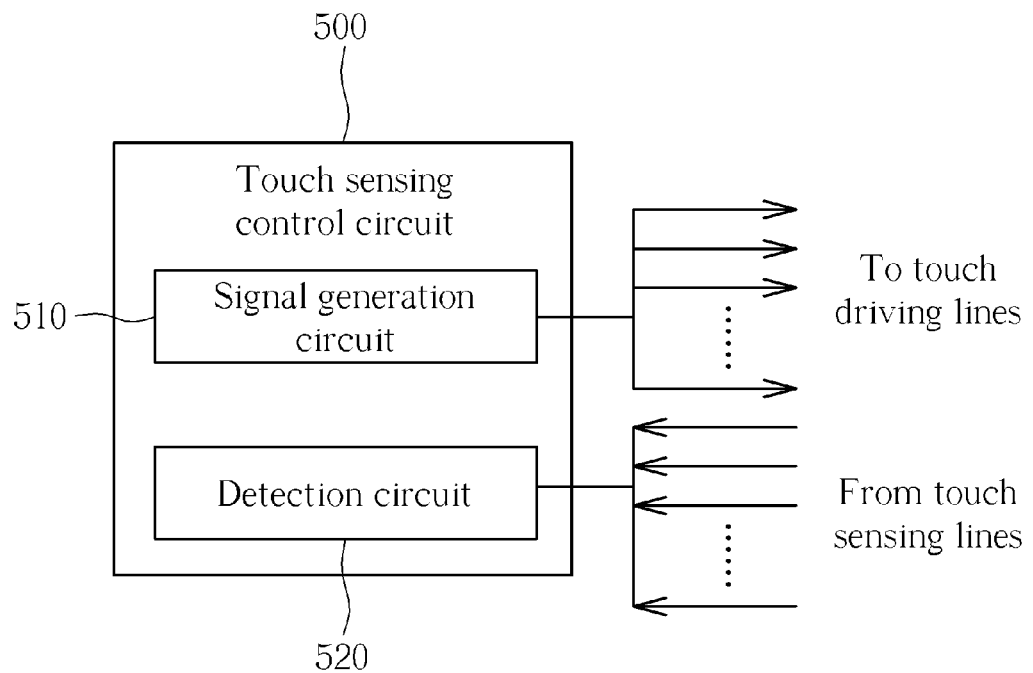
FIG. 5 illustrates a block diagram of a touch sensing control circuit according one embodiments of the present invention.

FIG. 5 schematically illustrates a block diagram of a touch sensing control circuit according to one embodiment of the present invention. As illustrated, the touch sensing control circuit 500 comprises a signal generation circuit 510 and a detection circuit 520. The signal generation circuit 510 is connected to a plurality of touch driving lines (probably through a multiplexer), wherein each of the touch driving lines could be one of the data lines of the driving circuitry of a display device. The signal generation circuit 510 generates one or more types of touch driving signals (different in polarity and/or in magnitude) to the touch driving lines on a line-by-line basis or to multiple ones each time. The detection circuit 520 is connected to a plurality of touch sensing lines (probably through a multiplexer), wherein each of touch sensing lines is formed by connecting multiples common electrodes together of the display device. When the touch driving signal is applied, the detection circuit 520 measures current/voltage from the touch sensing lines to detecting the touch sensing signals, thereby measuring the capacitance at each intersection.

Please note that although the illustrated pixel array is presented in a RGB layout. However, this is not a limitation of the present invention. According to the various embodiments of the present invention, the pixel array of the display device of the touch screen can be also implemented in other types of layout, such as RGBW.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In summary, the present invention provides an in-cell touch screen having the common electrode layer with openings, causing the touch sensing system to have low base mutual-capacitance such that the requirement of the high resolution ADC in the touch sensing system can be alleviated. In addition, the present invention also alleviate the requirement of the high resolution ADC in the touch sensing system by applying multiples touch driving signals with different polarities to lower the base capacitance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch screen, comprising:
a display device having a pixel array, comprising:
a plurality of data lines, arranged for driving the pixel array; and a common electrode layer, having a plurality of openings, arranged for providing a common voltage to the pixel array; and a touch sensing control circuit, coupled to the common electrode layer and a plurality of first data lines of the plurality of data lines, arranged for generating a first touch driving signal and applying the first touch driving signal to the plurality of first data lines; and detecting a plurality of touch sensing signals respectively from a plurality of common electrodes of the common electrode layer when the first touch driving signal is applied to one of the first data lines wherein the openings are arranged for reducing a base capacitance induced between at least one of the common electrodes and at least one of data lines and the openings are aligned with a direction along which the first driving signal is transmitted in an area of touch sensing: and the touch sensing control circuit further generates a second touch driving signal and applies the second touch driving signal to a plurality of second data lines of the data lines: the polarity of the first touch driving signal is different from a polarity of the second touch driving signal such that the second touch driving signal applied to the data lines leads to reduction of the base capacitance.

2. The touch screen of claim 1, wherein the plurality of first sub-pixels includes a plurality of columns of first sub-pixels of a same color in the pixel array, and each of the first data lines corresponds to one of columns of the first sub-pixels, respectively.

3. The touch screen of claim 2, wherein the openings are above and aligned with each of columns of the first sub-pixels, respectively.

4. The touch screen of claim 1, wherein a magnitude of the first touch driving signal is different from a magnitude of the second touch driving signal.

5. The touch screen of claim 1, wherein a number of the plurality of first data lines that the first touch driving signal is applied to is different from a number of the plurality of second data lines that the second touch driving signal is applied to.

6. The touch screen of claim 1, wherein the plurality of first sub-pixels includes a plurality of columns of first sub-pixels of a first color in the pixel array, the plurality of second sub-pixels includes a plurality of columns of second sub-pixels of a second color in the pixel array; each of the first data lines respectively corresponds to one of columns of the first sub-pixels, and each of the second data lines respectively corresponds to one of columns of the second sub-pixels.

7. The touch screen of claim 6, wherein the openings are above and aligned with each of columns of the second sub-pixels, respectively.

8. A touch sensing control circuit, comprising:
a signal generation circuit, coupled to a plurality of data lines of a display device, for generating a first touch driving signal, and applying the first touch driving to a plurality of first data lines of the data lines; and a detection circuit, coupled a plurality of common electrodes of the display device, for detecting a plurality of touch sensing signals from the common electrodes when the first touch driving signal is applied to one of the first data lines; wherein the common electrodes of the display device has a plurality of openings, and the openings are arranged for reducing a base capacitance induced between at least one of the common electrodes and at least one of data lines and the openings are aligned with a direction along which the first driving signal is transmitted in an area of touch sensing; and the signal generation circuit further generates a second touch driving signal and applies the second touch driving signal to a plurality of second data lines of the data lines; the polarity of the first touch driving signal is different from a polarity of the second touch driving signal such that the second touch driving signal applied to the data lines leads to reduction of the base capacitance.

9. The touch sensing control circuit of claim 8, wherein the plurality of first sub-pixels includes a plurality of columns of first sub-pixels of a same color in a pixel array of the display device, and each of the first data lines corresponds to one of columns of the first sub-pixels, respectively.

10. The touch sensing control circuit of claim 8, wherein a magnitude of the first touch driving signal is different from a magnitude of the second touch driving signal.

11. The touch sensing control circuit of claim 8, wherein a number of the plurality of first data lines that the first touch driving signal is applied to is different from a number of the plurality of second data lines that the second touch driving signal is applied to.

12. The touch sensing control circuit of claim 8, wherein the plurality of first sub-pixels includes a plurality of columns of first sub-pixels of a first color in the pixel array, and the plurality of second sub-pixels includes a plurality of columns of second sub-pixels of a second color in the pixel array; each of the first data lines respectively corresponds to one of columns of the first sub-pixels, and each of the second data lines respectively corresponds to one of columns of the second sub-pixels.

* * * * *